Aug. 27, 1968  G. B. NICHOLS  3,399,299

APPARATUS FOR PHASE STABILITY DETERMINATION

Filed Nov. 2, 1964

INVENTOR
Grady B. Nichols

BY
ATTORNEYS

United States Patent Office 3,399,299
Patented Aug. 27, 1968

3,399,299
APPARATUS FOR PHASE STABILITY DETERMINATION
Grady B. Nichols, Lanham, Md., assignor to the United States of America as represented by the Administrator of the National Aeronautics and Space Administration
Filed Nov. 2, 1964, Ser. No. 408,442
4 Claims. (Cl. 235—154)

ABSTRACT OF THE DISCLOSURE

Apparatus for processing a high-frequency signal to be applied to correlation means to determine the phase stability thereof. Two auxiliary oscillators each provides a signal having the same characteristics as the high-frequency signal under consideration, and these are independently multiplied with the high-frequency signal to produce two product signals. High frequency components are removed from the product signal to provide two low frequency signals each having a component introduced by the phase instability of the original high frequency signal. These two low frequency signals, in turn, are digitized are are available to be applied to correlation apparatus whereby the phase and frequency instability of the high-frequency signal may be determined.

---

Figure 1:
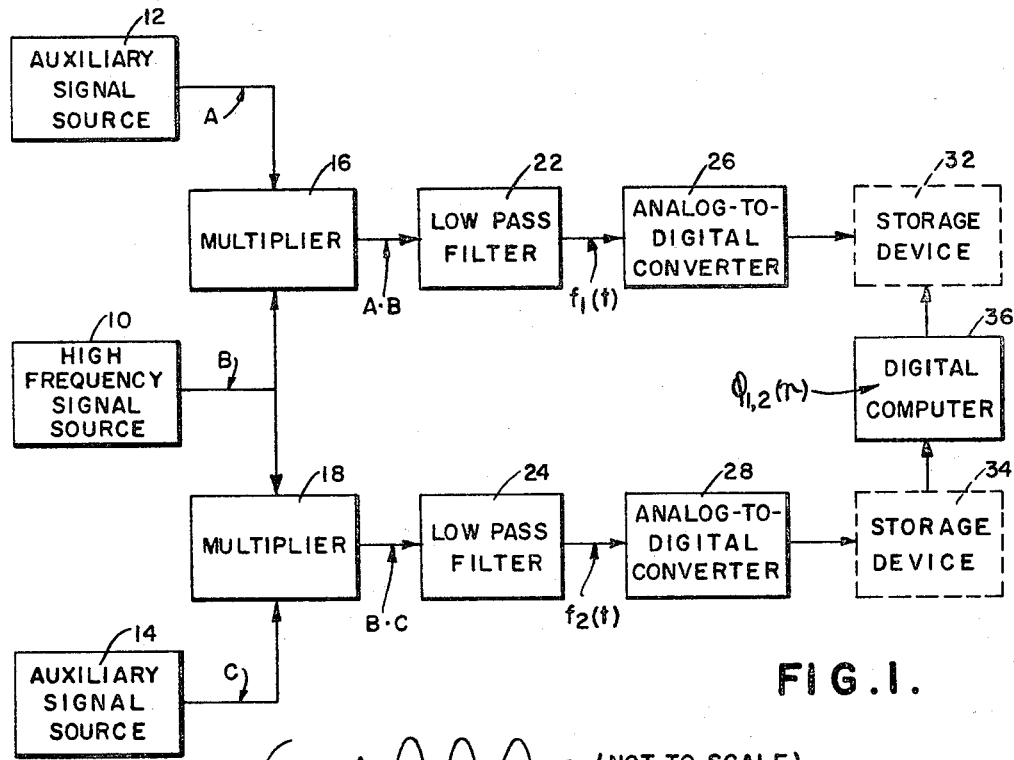

The invention described herein may be manufactured and used by and for the Government of the United States of America for governmental purposes without the payment of any royalties thereon or therefor.

This invention relates generally to frequency measurement techniques, and more particularly to apparatus for determining the absolute phase stability of a high frequency signal source by cross-correlation of two independently generated low frequency signals to produce an equivalent autocorrelation of the high frequency signal.

There are many instances where it is desirable to obtain an accurate determination of the phase stability of a reference signal such as a sine wave. For example, in the design of narrowband, phase-locked receivers, knowledge of the phase stabiliy of the receiver reference signal source is required so that optimum receiver bandpass characteristics can be utilized that will reject noise yet remain locked to the transmitter.

A particularly useful technique for measuring slight frequency and phase variations with a high degree of accuracy is that of autocorrelation, that is, comparing a signal with itself in a manner to produce a function which is the time average of the product of the signal by the same signal shifted in phase. When the two signals are in phase the autocorrelation function is a maximum, and when the phase shift is a quarter wave, or any odd multiple thereof, the autocorrelation function approaches zero. In the instance of a periodic signal source, for example, the resulting autocorrelation function contains information about the spectral power distribution contour which contains frequency components that produce the phase instability, and such components can be extracted therefrom by further analysis of the autocorrelation function.

The preferred and established techniques for obtaining the autocorrelation function of a signal include the use of a data processing digitial computer of a conventional type. Program charts are available for use with such computers to enable the autocorrelation function of a signal to be obtained. Such techniques have the further advantage of providing memory storage of the digitized signal, and the computer may also be programmed so that the resulting correlation function may be transformed from a time base to a frequency base by the use of La Place and Fourier transforms.

Briefly, the signal is sampled at discreet intervals on a time base to provide a digital information representative of the instantaneous magnitude (voltage) of the signal for each sampling. The same signal, shifted in time, is similarly sampled. Each sample of the signal is then multiplied, in turn, by all the samples of the phase shifted signal, with the result of all such multiplications added and divided by the number of samples to produce a correlation function representing an average power density. Subsequent frequency analysis of this correlation function provides an indication of the phase stability of the signal under investigation.

It is readily apparent from the foregoing that for a periodic signal such as a sine wave, a number of samples must be taken for each cycle in order to provide satistically significant results. However, at the present state of the computer art the rate at which a signal can be digitized, stored and processed in a digital computer is limited by frequency response considerations of the various equipments involved. Accordingly, the foregoing technique is not practicable for use with oscillators providing reference sine waves of 30 megacycles or higher, a common frequency range used in present day phase-locker telemetry receivers. This problem has therefore been approached by translating the signal to a lower frequency by use of mixers or product detectors. However, such arrangements require the use of an extremely stable local oscillator which must be at least as stable as the signal source under investigation, and since the signal source itself may require state-of-the-art stability, inconclusive results are obtained. For example, accuracies of one part in $10^8$ are required, and present techniques are based on the tenebrous assumption that the local oscillator is good as, or no worse than, the signal source under investigation. In addition, since the signal source and the local oscillator have the same characteristics, it is difficult to identify the desired signal which is to be processed.

Accordingly, it is an object of the present invention to provide apparatus useful in determining the phase stability of a high frequency signal source.

Another object of the present invention is to provide an improvement in apparatus for performing the equivalent autocorrelation of a signal by the cross-correlation of two signals of lower frequency, each having a common frequency component.

A further object of the present invention is to provide novel apparatus for determining the phase stability of a high frequency signal by use of a digital computer adapted to perform the cross-correlation of two low frequency signals derived from the multiplication of the high frequency signal and two auxiliary signals of similar characteristics.

The foregoing and further objects of the present invention are attained by providing two auxiliary signals from oscillators having characteristics similar to those of the oscillator producing the signal of interest under investigation. The auxiliary signals are independently multiplied with the signal of interest, and the high frequency components removed therefrom to provide two low frequency signals, each containing a frequency component introduced by the phase instability of the signal source under investigation. These two low frequency signals, in turn, are digitized and either stored or fed directly into a digital computer. The computer is programmed to compute the cross-correlation function of the two lower frequency signals, that is, provide a signal that represents the degree of time coherence of those components of the two low frequency signals that have the same frequency and phase. This cross-correlation function, in turn, is the equivalent of the autocorrelation of the signal of interest, and provides a spectral power distribution contour from which the frequency instability of the oscillator producing the signal of interest may be determined. For example, the La Place or Fourier transformation of the resulting correlation function will provide those frequency components common to both low frequency signals and thus contributed by the phase instability of the oscillator generating the signal of interest.

Figure 2:
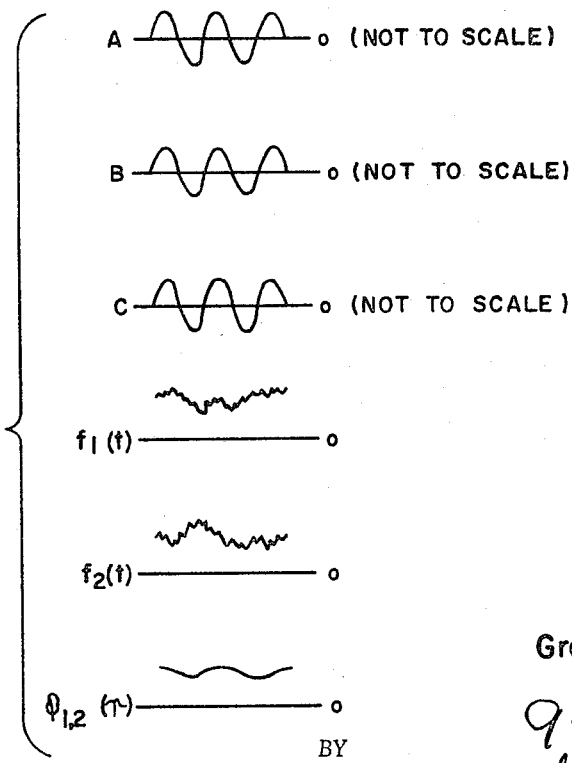

The various features and attending advantages of the invention will become readily apparent from the following description when considered in conjunction with the accompanying drawing, in which:

FIGURE 1 is a schematic block diagram showing a preferred embodiment of apparatus for carrying out the present invention; and FIGURE 2 illustrates characteristic waveforms corresponding to signals at designated points in the block diagram of FIGURE 1.

Referring now to FIGURE 1, oscillator 10 represents the signal source under investigation and produces the signal of interest. Oscillator 10 may be any periodic signal source, the absolute phase stability which is to be determined. Representatively, but not limiting, oscillator 10 may be the reference oscillator for the automatic phase control loop of a phase-locked receiver and generates a sine wave in the order of 30 megacycles.

There are also provided two additional oscillators 12 and 14, to produce two auxiliary signals having the same characteristics (center frequency, input and output impedance, etc.) as the signal generated by oscillator 10. Thus, for the purpose of a given investigation, oscillators 12 and 14 may be constructed identically to oscillator 10.

The output of oscillator 10 is supplied separately to each multiplier 16 and 18. Multiplier 16 further receives the output of oscillator 12, and multiplier 18 further receives the output of oscillator 14. Multipliers 16 and 18 may be mixers of conventional type, capable of producing a product signal (the dot product) of signals fed thereto to thereby provide an output signal including the sum and difference frequencies of such signals.

The high frequency components of the output of multipliers 16 and 18, including the center frequency and the sum frequencies of oscillators 10, 12 and 14, are removed by low pass filters 22 and 24, respectively. Since oscillators 12 and 14 have the same nominal center frequency as oscillator 10, there remains a difference frequency provided by the phase instability (or noise disturbances of the outputs of oscillators 10, 12 and 14. This is a quasi-random signal having a relatively low fundamental frequency. It is to be noted at this point that the resulting phase instability or noise disturbances of oscillators 10, 12 and 14 are uncorrelated because of the independent mixing of the outputs of oscillators 10 and 12 and of oscillators 10 and 14. The frequency components contributed by the phase instability of oscillator 10 is common to the output of both low pass filters 22 and 24.

The output of low pass filter 22 is fed to analog-to-digital converter 26 and the output of low pass filter 24 is fed to analog-to-digital converter 28. Analog-to-digital converters 26 and 28 may be conventional digital encoders, operable to convert an analog input to a digitized output in a code format required by a digital computer. Typically, the analog input received from low pass filters 22 and 24 is sampled at discreet time intervals, with analog-to-digital converters 26 and 28 providing binary numbers indicative of the instantaneous voltage level of the two low frequency signals supplied by low pass filters 22 and 24.

The outputs of analog-to-digital converters 26 and 28 are fed to storage devices 32 and 34 (such as a tape recorder, punch cards or memory drum), or fed directly to computer 36. Computer 36 is a digital data processing computer of standard type (for example, an IBM 7090 computer) programmed to operate on two applied digital signals to provide the cross-correlation function thereof. The frequency distribution of the cross-correlation function may be obtained by further programming the computer 36 to operate on it so as to provide its La Place transform. Programs for digital computers to perform cross-correlation and to take the La Place transform of the resulting correlation function are known in the art, and in detail form no part of the present invention.

There are, in addition, several special purpose equipments available for obtaining the cross-correlation of the signals derived from the output of analog-digital converters 26 and 28.

With reference now to FIGURE 2, the outputs of oscillators 10, 12 and 14 are representatively shown by waveforms A, B and C. It is to be noted that each output is sinusoidal in nature and all are substantially similar, each varying from the other only by its phase instability, $\phi$. Thus, the output of each oscillator may be expressed as follows:

(1) $\quad A = \cos w_1 t + \phi_1(t)$ (2) $\quad B = \cos w_2 t + \phi_2(t)$ (3) $\quad C = \cos w_3 t + \phi_3(t)$ As a result of the action of multipliers 16 and 18, the following dot products are provided:

(4) $A \cdot B = [\cos w_1 t + \phi_1(t)][\cos w_2 t + \phi_2(t)]$
$= \frac{1}{2} \cos [(w_1 + w_2)t + \phi_1(t) + \phi_2(t)]$
$= \frac{1}{2} \cos [(w_1 + w_2)t + \phi_1(t) + \phi_2(t)]$ (5) $B \cdot C = [\cos w_2 t + \phi_2(t)][\cos w_3 t + \phi_3(t)]$
$= \frac{1}{2} \cos [(w_2 + w_3)t + \phi_2(t) + \phi_3(t)]$
$+ \frac{1}{2} \cos [(w_2 - w_3)t + \phi_2(t) - \phi_3(t)]$ Low pass filters 22 and 24 reject the sum components and Equations 4 and 5 are reduced to the following:

(6) $\quad f_1(t) = \cos [(w_1 - w_2)t + \phi_1(t) - \phi_2(t)]$ (7) $\quad f_2(t) = \cos [w_2 - w_3)t + \phi_2(t) - _3(t)]$ In addition, by making the frequency of auxiliary signal sources 12 and 14 the same as high-frequency signal source 10, as previously mentioned, the difference components are effectively cancelled. As a result, Equations 6 and 7 are reduced to:

(8) $\quad f_1(t) = \cos [\phi_1(t) - \phi_2(t)]$ (9) $\quad f_2(t) = \cos [\phi_2(t) - \phi_3(t)]$ These signals [$f_1(t)$ and $f_2(t)$] are the one which are digitized and stored and/or fed into computer 36 for cross-correlation. Since the low frequency components of signal B are common to both, this cross-correlation is equivalent to an autocorrelation of the original signal produced by oscillator 10, but at a substantially lower frequency. This allows, therefore, an equivalent autocorrelation to be performed, by use of a digital computer, of a signal higher in frequency than the frequency response of such processing equipment as analog-to-digital converters 26, 28, storage devices 32, 34 and computer 36.

The cross-correlation function is obtained from:

(10) $$\varphi 1, 2(\tau) = \frac{1}{T} \int_{-\frac{T}{2}}^{\frac{T}{2}} f_1(t) f_2(t + \tau) dt$$

In the cross-correlation process $f_1(t)$ is multiplied by $f_2(t)$ and the average value of this product determined. Subsequently, $f_2(t)$ is shifted in time by an amount $\Delta \tau$ and a new average product determined. As $f_2(t)$ is successively shifted by $\Delta \tau$ and further average products determined, components common to both $f_1(t)$ and $f_2(t)$ (i.e., those components introduced by the phase instability of oscillator 10) add or are correlated, while those not common (i.e., those introduced by oscillators 12 and 14, go to zero). Thus the cross-correlation of the waveforms of $f_1(t)$ and $f_2(t)$ (expressed by Equations 6 and 7) provide a spectral power distribution indicative of the phase instability introduced by oscillator 10. This, in turn, may be further subjected to the La Place or Fourier transformation to provide frequency components that are the measure of the phase instability of oscillator 10.

The invention provides, therefore, a novel method and apparatus for determining the phase stability of a high frequency signal source by cross-correlation of two low frequency signals, each having a common frequency component, to produce an equivalent autocorrelation of the common frequency component. The invention is particularly useful with digital computers and associated memory storage, and allows a phase stability determination to be made for signals appreciably higher in frequency than normally possible with digital computers and associated data processing apparatus. In addition, the invention eliminates the need for a stable, known reference frequency source of equal or greater accuracy than that of the signal source under investigation.

While a preferred embodiment of the invention has been described with particularity, it should be apparent to those skilled in the art that modifications and variations thereof are possible. It is therefore to be understood that, within the scope of the appended claims, the invention may be practiced otherwise than as described.

What is claimed as new and desired to be secured by Letters Patent of the United States is:

1. Apparatus for processing a high frequency signal for application to digital cross-correlation means, said apparatus comprising:
    first and second auxiliary signal sources each generating a signal having the same characteristics as said high frequency signal;
    means for independently mixing the output of each said auxiliary signal sources with said high frequency signal to provide two product signals;
    means for removing high frequency signal components from each said product signal to provide two low frequency signals each containing frequency components introduced by the phase instability of said high frequency signal source; and
    means for providing a digitized representation for each of said two low frequency signals, applied as an input to said means;
    whereby said low frequency signals are converted into a form for application to said cross-correlation means to provide the equivalent auto-correlation of said high frequency signal.

2. The apparatus according to claim 1, wherein said means for independently mixing includes:
    a first multiplier connected to receive the output of said first auxiliary signal source and said high frequency signal; and
    a second multiplier connected to receive the output of said second auxiliary signal source and said high frequency signal source.

3. The apparatus according to claim 2, wherein said means for removing high frequency components includes a low pass filter coupled to the output of each said multiplier.

4. The apparatus according to claim 3, wherein said means for providing a digitized representation includes an analog-to-digital converter coupled to the output of each said low pass filter.

References Cited
UNITED STATES PATENTS

| | | | |
|---|---|---|---|
| 2,692,332 | 10/1954 | Godbey | 250—20 |
| 2,735,001 | 2/1956 | Witters | 250—20 |
| 3,008,043 | 11/1961 | Caulk | 250—20 |
| 3,045,180 | 7/1962 | Losher | 324—77 |
| 3,074,014 | 1/1963 | Ross | 324—77 |
| 3,195,059 | 7/1965 | Adams | 329—122 |
| 3,123,769 | 3/1964 | Meyer | 324—82 |
| 3,337,870 | 8/1967 | Allen et al. | 343—17.5 |

MALCOLM A. MORRISON, *Primary Examiner.*

F. D. GRUBER, *Assistant Examiner.*